Feb. 17, 1959     L. D. THOSTENSON     2,873,777
WHEEL SUPPORTING AND CLAMPING DEVICE
Filed March 7, 1956     4 Sheets-Sheet 2
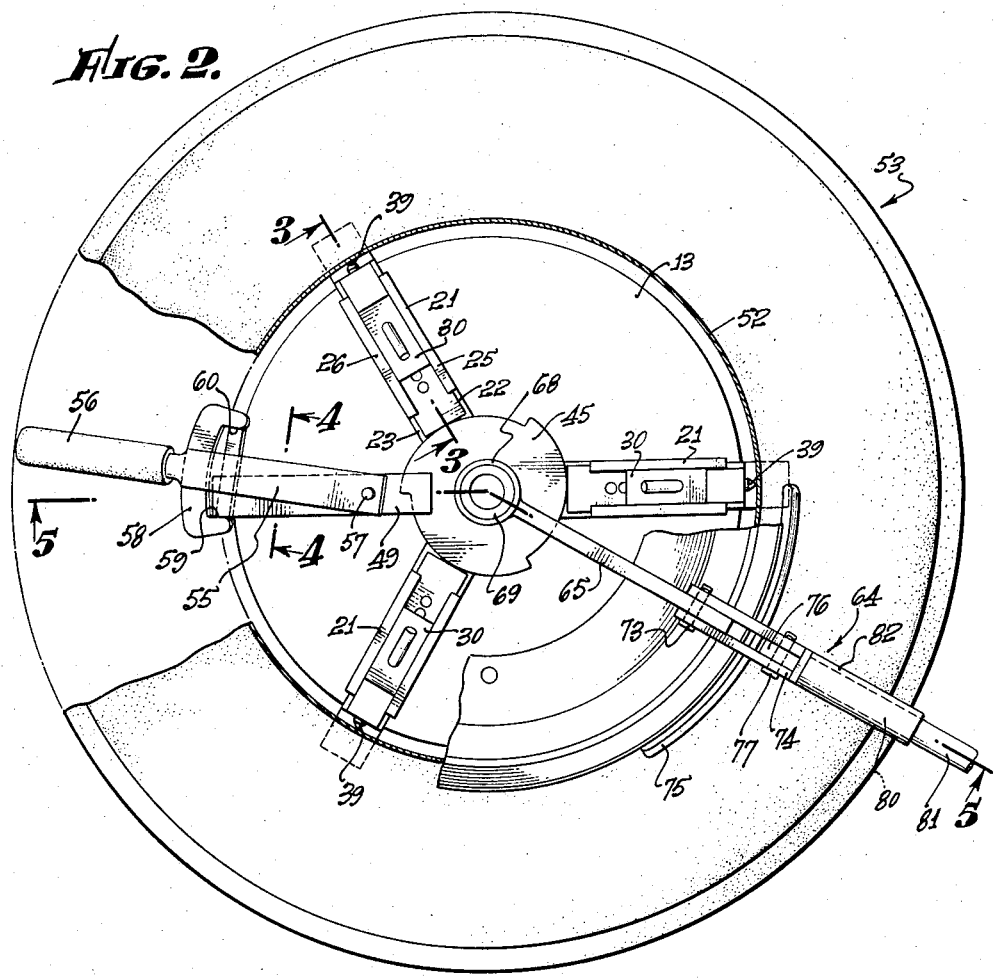
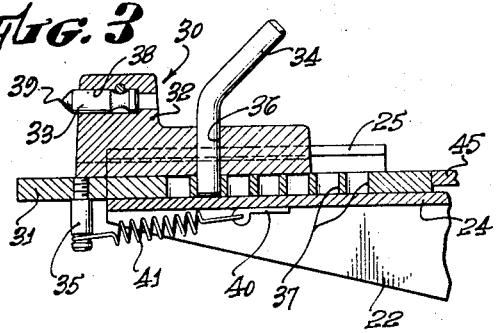
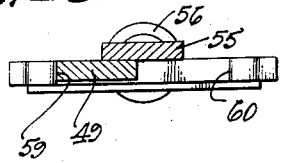
INVENTOR.
LEWIS D. THOSTENSON
BY HIS ATTORNEYS.
HARRIS, KIECH, FOSTER & HARRIS

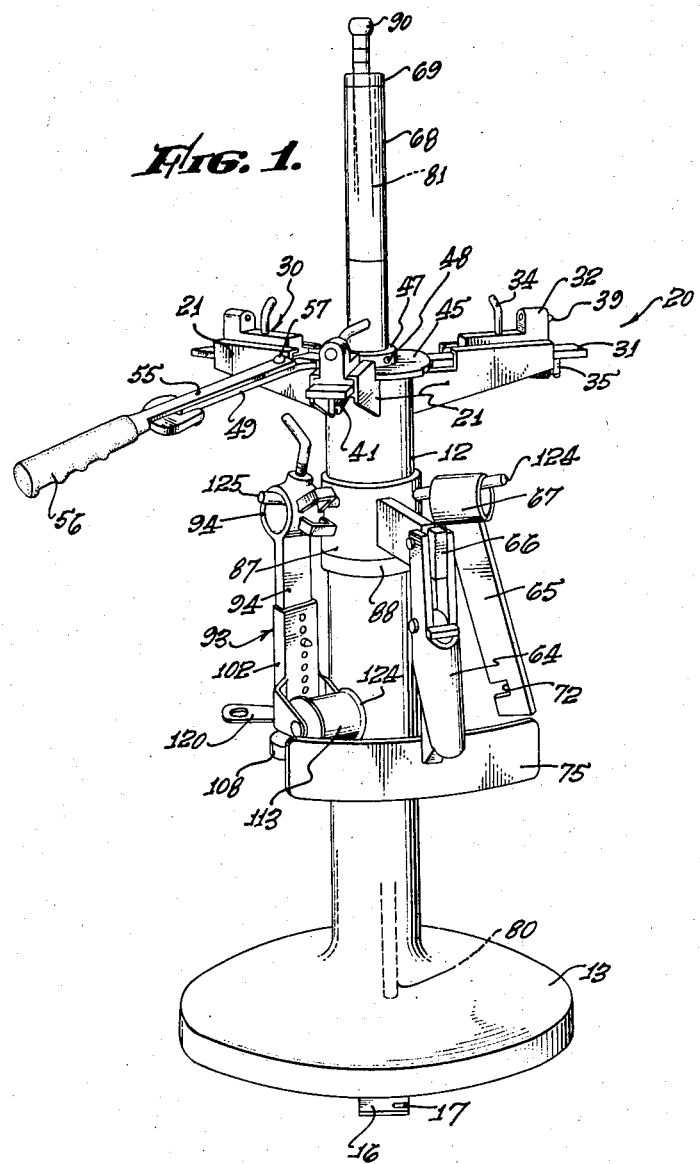

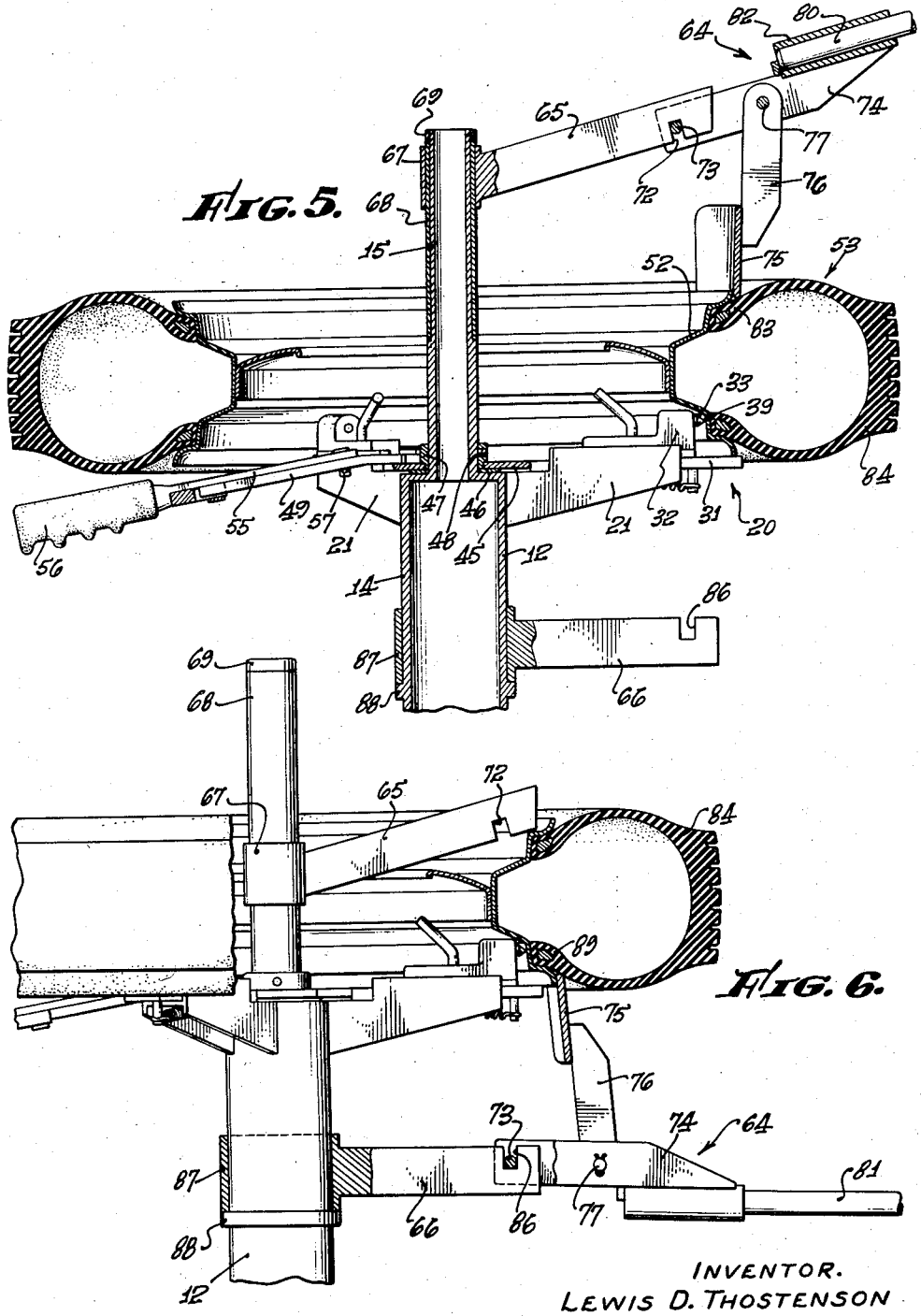

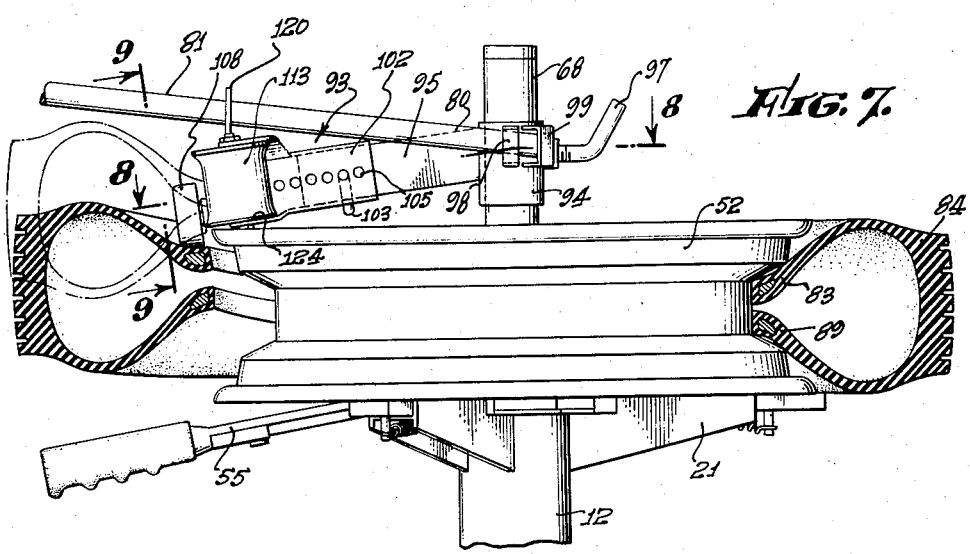
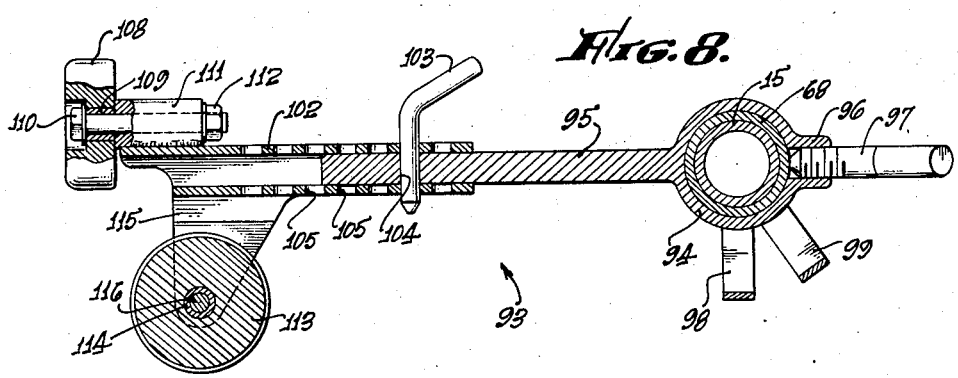
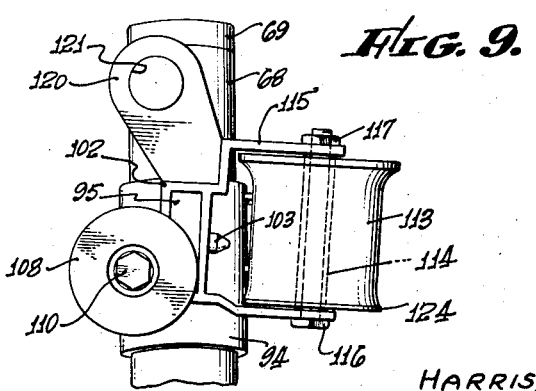
INVENTOR.
LEWIS D. THOSTENSON
BY HIS ATTORNEYS.
HARRIS, KIECH, FOSTER & HARRIS

United States Patent Office 2,873,777
Patented Feb. 17, 1959

2,873,777

WHEEL SUPPORTING AND CLAMPING DEVICE

Lewis D. Thostenson, Inglewood, Calif., assignor to Salsbury Corporation, Los Angeles, Calif., a corporation of California Application March 7, 1956, Serial No. 570,114

2 Claims. (Cl. 144—288)

This invention relates to a tire changing device and in particular to an apparatus for installing and removing pneumatic tires, either with or without inner tubes, from rims of vehicle wheels.

It is an object of the invention to provide a single apparatus with which all of the steps necessary in changing a tire can be simply, easily and rapidly carried out without injury to the tire.

It is another object of the invention to provide an apparatus upon which various sizes of vehicle wheels may be mounted and with which the wheel can be rapidly and securely gripped. A further object of the invention is to provide such an apparatus having a plurality of pins which are forced into engagement with the trim of a wheel by a hammer-actuated cam.

It is a further object of the invention to provide a tire changing apparatus having upper and lower rotating supports for positioning a bead breaker at various points around the circumference of both beads of the tire. Another object of the invention is to provide such an apparatus in which the upper support may be axially moved to engage the rim of the wheel while the lower bead is being broken in order to prevent bending of the wheel.

It is another object of the invention to provide a tire changing apparatus having two rollers, one of which engages both beads of a tire and forces both beads outward to the rim of the wheel, the other of which engages the upper bead of the tire and forces both beads downward over the rim of the wheel, thereby enabling a tire to be installed on a rim with one revolution of the rollers about the wheel. A further object of the invention is to provide such a tire changing apparatus in which the roller which forces the beads outward has a width greater than twice the width of a bead. Another object of the invention is to provide such an apparatus in which the wide roller has a substantially cylindrical central portion and outwardly flaring end portions. It is also an object of the invention to provide such an apparatus in which the axes of rotation of the rollers are oblique to the plane of the wheel and are displaced from and perpendicular to each other.

It is a further object of the invention to provide such a tire changing apparatus in which all of the components thereof are carried on the central support post, thereby eliminating any need for additional storage facilities.

The invention also comprises novel details of construction and novel combinations and arrangements of parts, which will more fully appear in the course of the following description. The drawings merely show and the description merely describes a preferred embodiment of the present invention which is given by way of illustration or example.

Fig. 1 is an isometric view of a preferred embodiment of the invention;

Fig. 2 is an enlarged top view of the embodiment of Fig. 1 with a vehicle wheel positioned thereon, portions of the wheel being broken away;

Fig. 3 is a sectional view taken along the line 3—3 of Fig. 2;

Fig. 4 is a sectional view taken along the line 4—4 of Fig. 2;

Fig. 5 is a sectional view taken along the line 5—5 of Fig. 2;

Fig. 6 is a partial sectional view similar to that of Fig. 5, showing another step in the tire dismounting operation;

Fig. 7 is a view similar to that of Fig. 5, showing a step in the tire mounting operation;

Fig. 8 is a sectional view taken along the line 8—8 of Fig. 7; and

Fig. 9 is a view taken along the line 9—9 of Fig. 7.

The tire changing device of the invention includes a vertically disposed support post 12 having an outwardly flaring base 13 (Fig. 1), the support post 12 being hollow and having a lower portion 14 of greater diameter than an upper portion 15 (Fig. 5). Three mounting ears 16 are attached to and equally spaced around the periphery of the base 13, each of the ears having a slot 17 for receiving a mounting stud to hold the tire changing device in position. The entire unit may be removed by loosening the three studs or nuts and rotating the unit a few degrees to move the studs out of the slots of the mounting ears.

A wheel supporting unit 20 is positioned on the support post 12 adjacent the junction of the upper and lower portions thereof. Three radially extending brackets 21 are equally spaced around the support post (Fig. 2), each of the brackets including vertically extending parallel plates 22, 23 joined by a horizontal plate 24 with the vertical plates having inwardly turned upper edges 25, 26 defining a guideway between the upper edges and the horizontal plate (Fig. 3).

A clamping unit 30 consisting of an apertured plate 31, a block 32, a pin 33, a guide pin 34 and a spring post 35, is slideably positioned in the guideway between the upper edges and the horizontal plate of each of the brackets 21 (Fig. 3). The block 32 is fixed relative to the apertured plate 31 by the guide pin 34 which is positioned in an opening 36 in the block 32 and in one of the openings 37 in the apertured plate 31. The plurality of openings 37 in the apertured plate permits the block to be moved manually relative to the plate so that the wheel supporting unit may be used with various sizes of vehicle wheels. The pin 33 is mounted in an opening 38 in the block 32, the pin having means for engaging the rim of a wheel at its outer end, this means preferably being a hardened point 39. The spring post 35 is fixed to the apertured plate 31 and is coupled to a spring bracket 40 on the horizontal plate 24 by a tension spring 41 which urges the clamping unit inward toward the support post.

A cam 45 is positioned around the upper portion 15 of the support post 12, the cam resting upon a washer 46 and rotating about a bushing 47 which is fixed to the support post by a set screw 48 (Figs. 2 and 5). A radially extending bar 49 is fixed to the cam 45 by suitable means such as welding, for rotating the cam about the support post.

The springs 41 maintain the clamping units 30 in engagement with the cam 45. When the cam is rotated clockwise, as seen in Fig. 2, the clamping units are forced outward with the points 39 engaging a rim 52 of a wheel 53, the wheel having previously been positioned on the tire changing device with the rim resting on the plates 31.

The invention includes a special cam rotating structure for imbedding the points of the pins in the rim of the wheel to securely held the wheel in position and for loosening the cam when the tire changing operation is complete. A handle 55 having a hand grip 56 at the outer end thereof, is pivotally coupled to the bar 49 by a pin 57. A U-shaped bracket 58 having opposed striking surfaces 59 and 60 is fixed to the handle 55 adjacent the hand grip 56, the bracket being positioned so that the outer end of the bar 49 lies between the arms of the U (Figs. 2 and 4). When the handle is rotated clockwise, as shown in Fig. 2, the striking surface 59 will impinge on the bar 49 and tend to rotate the cam 45 in the same direction. After the cam has been rotated to bring the points in contact with the rim of the wheel, the handle may be moved a short distance in the opposite direction and then again moved clockwise rapidly, effectively striking a hammer blow on the bar 49. One or two such blows are sufficient to imbed the points in the rim and satisfactorily secure the wheel on the tire changing device. When it is desired to remove the wheel from the tire changer, a similar hammer blow in the opposite direction will loosen the cam and the points will be withdrawn by the spring action described above.

After a wheel has been secured on the tire changing device and the tire has been deflated, it is necessary to break the bead of the tire loose from the rim of the wheel prior to removing the tire from the rim. A bead breaker 64 is used in conjunction with an upper bead breaker support arm 65 and a lower bead breaker support arm 66. A cylindrical shell 67 fixed to one end of the upper support arm 65 is slideable along a sleeve 68 which is rotatably mounted upon the support post 12, the sleeve being retained in position by a collar 69 which is fixed to the support post (Fig. 5). A notch 72 adjacent the outer end of the upper support arm 65 provides a pivot point for a pin 73 fixed in the body 74 of the bead breaker 64. A circular segment 75 is pivotally suspended from the body 74 by a bar 76 and pin 77. A smooth end 80 of a rod 81 is positioned in a socket 82 formed integrally with the body 74 of the bead breaker permitting manual application of force downward on the bead 83 of a tire 84 when the apparatus is positioned as shown in Fig. 5. The bead breaker may be successively positioned around the entire circumference of the tire to rapidly loosen the bead from the rim without injuring the tire.

After the upper bead 83 has been loosened, the bead breaker is removed from the notch 72 and engaged in a notch 86 in the lower support arm 66 (Fig. 6). A cylindrical sleeve 87 is fixed to the inner end of the lower support bar 66 and is rotatably positioned about the support post 12, resting on a shoulder 88 formed integrally with the support post. The upper support bar 65 is slid downward along the sleeve 68 until the outer end of the bar engages the rim of the wheel substantially vertically above the lower support bar 66. Then when the bead breaker 64 is operated to loosen the lower bead 89 of the tire, the upper support bar provides a restraining force on the rim preventing bending of the rim by the force exerted with the bead breaker. The bead breaker may be moved around the circumference of the tire when engaged with the lower support arm in the same manner as when engaged with the upper support arm.

After both beads have been loosened from the rim, the tire may be removed in the conventional manner by inserting a roller end 90 of the rod 81 between the tire and rim, the rod being stored within the hollow support post 12 when not in use (Fig. 1).

A tire is mounted on a rim in the tire changing device of the invention by one revolution of a dual roller arm 93 (Figs. 7, 8 and 9). A cylindrical shell 94 adapted to slide over the sleeve 68 is carried at one end of a bar 95, the shell 94 having a threaded boss 96 for receiving a set screw 97 which is engageable with the sleeve 68 to fix the roller arm relative to the sleeve. Straps 98 and 99 are fixed to the outer surface of the shell 94 and serve as a socket for the end 80 of the rod 81. An apertured box beam 102 is telescopically mounted on the bar 95, the beam being fixed relative to the bar by a guide pin 103 which engages an opening 104 in the bar 95 and one of the openings 105 in the apertured box beam.

A roller 108 is rotatably mounted on a bushing 109 carried by a bolt 110 fixed to a sleeve 111 by a nut 112, the sleeve being attached to the outer end of the box beam 102 by suitable means, such as by welding. A roller 113 is rotatably mounted on a bushing 114 positioned between the outstanding arms of a U-shaped bracket 115 by a bolt 116 and nut 117, the U bracket 115 being fixed to the box beam 102 adjacent the sleeve 111. An ear 120 having an opening 121 is fixed to and extends upward from the box beam adjacent the outer end thereof, the ear serving as a fulcrum for the rod 81, as seen in Fig. 7.

The roller 113 is made wider than twice the width of a bead of a tire which is to be mounted using the apparatus of the invention. The central portion of the roller 113 is preferably cylindrical in form and the upper and lower ends are preferably flared outward as seen in Fig. 9. In mounting a tire on a rim, both beads of the tire will be positioned on the central portion of the roller 113. The outwardly flared upper edge prevents the beads from moving upward over the roller, and the lower edge, which is flared outward to a lesser extent than the upper edge, retains the beads on the central portion of the roller until the beads are forced downward by the roller 108. The rollers 108 and 113 are positioned so that their axes of rotation are perpendicular to each other. It is preferred in constructing the apparatus of the invention to fix the bar 95 to the shell 94 so that the axis of rotation of the roller 113 is displaced from the vertical as shown in Fig. 7, thus making it easier for the roller 108 to push the beads off the roller 113. Furthermore, it is preferred to position the bar 95 askew with respect to the shell 94 so that the axis of rotation of the roller 113 is also displaced from the vertical as shown in Fig. 9, so that the leading edge 124 of the roller 113 is close to the top edge of the rim 52. This prevents pinching of the bead of the tire between the rollers and the rim while mounting the tire, an especially important factor when using tubeless tires. In the embodiment of the invention shown in this specification, the preferred amount for the displacement of the axis shown in Fig. 7 is in the order of 15° and the preferred amount for the displacement in Fig. 9 is in the order of 4°.

A tire is mounted on a rim with the apparatus of the invention by placing the tire on top of a rim fixed in the wheel supporting unit. Then the dual roller arm 93 is slid onto the sleeve 68, the roller 113 engaging both beads of the tire and pushing them outward and the roller 108 engaging the upper bead of the tire and pushing both beads downward over the edge of the rim. The roller arm 93 is then rotated about the support post 12 by means of the rod 81 passing through the opening 121 in the ear 120 and resting in the straps 98 and 99. In Fig. 7, the roller arm 93 is being rotated toward the viewer, the position of that portion of the tire ahead of the roller arm being shown in phantom. A single revolution of the roller arm will move both beads of the tire to their proper positions for inflation.

Pins 124 and 125 are mounted in and project outward and upward from the cylindrical sleeve 87 which rotates about the support post 12 resting on the shoulder 88 (Fig. 1). When not in use, the upper support bar 65 may be stored on the pin 124, the roller arm 93 may be stored on the pin 125 and the bead breaker 64 may be stored on the lower support arm 66, thus avoiding the necessity of providing separate storage facilities for the various elements of the tire changing device.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In an apparatus for changing tires on a vehicle wheel, the combination of: a support post; a plurality of radially extending blocks carried by said support post and positioned to support a horizontally disposed vehicle wheel, said blocks being slideable in a horizontal plane relatively to said support post, each of said blocks including means for engaging the rim of the vehicle wheel; a cam rotatably mounted on said support post and contacting said blocks, said cam having a pivot point and opposed impact surfaces positioned outward from said pivot point; spring means for urging said blocks into contact with said cam, the rotation of said cam in a predetermined direction moving said blocks outward and moving said means for engaging the rim into engagement with the rim; and handle means for rotating said cam, said handle means being pivotally mounted at said pivot point and including opposed striking surfaces positioned to engage said impact surfaces respectively when moved in opposite directions about said pivot point.

2. In a vehicle wheel mounting apparatus, the combination of: a support frame; a plurality of wheel engaging elements mounted on said frame for sliding movement toward and away from a central point on said frame; a cam rotatably mounted on said frame and contacting said elements, with rotation of said cam in a predetermined direction moving said elements away from said central point and into engagement with a wheel supported on said apparatus, said cam having a pivot point and opposed impact surfaces positioned outward from said pivot point; and handle means for rotating said cam, said handle means being pivotally mounted at said pivot point and including opposed striking surfaces positioned to engage said impact surfaces respectively when moved in opposite directions about said pivot point.

References Cited in the file of this patent

UNITED STATES PATENTS

| | | |
|---|---|---|
| 705,724 | Upson | July 29, 1902 |
| 776,831 | Geddes | Dec. 6, 1904 |
| 1,646,511 | Weaver et al. | Oct. 25, 1927 |
| 1,742,590 | Freivogel | Jan. 7, 1930 |
| 2,194,936 | Hatch | Mar. 26, 1940 |
| 2,197,808 | Mason | Apr. 23, 1940 |
| 2,437,512 | Ekse | Mar. 9, 1948 |
| 2,569,788 | Weaver | Oct. 2, 1951 |
| 2,569,789 | Weaver | Oct. 2, 1951 |
| 2,695,659 | Athmann | Nov. 30, 1954 |
| 2,764,194 | Schultz | Sept. 25, 1956 |
| 2,808,860 | Hildebrant | Oct. 8, 1957 |

FOREIGN PATENTS

| | | |
|---|---|---|
| 492,250 | France | Mar. 11, 1919 |

UNITED STATES PATENT OFFICE
CERTIFICATE OF CORRECTION

Patent No. 2,873,777                                         February 17, 1959

Lewis D. Thostenson

It is hereby certified that error appears in the printed specification of the above numbered patent requiring correction and that the said Letters Patent should read as corrected below.

Column 1, line 28, for "trim" read -- rim --; column 2, line 71, for "held" read -- hold --; column 5, line 12, for "relatively" read -- relative --.

Signed and sealed this 16th day of June 1959.

(SEAL)
Attest:

KARL H. AXLINE                                               ROBERT C. WATSON
Attesting Officer                                          Commissioner of Patents